(12) United States Patent
Maxwell

(10) Patent No.: US 8,342,532 B1
(45) Date of Patent: Jan. 1, 2013

(54) DRAW AND LEARN, AN EDUCATIONAL CARD GAME

(76) Inventor: Doretha E Maxwell, Castor, LA (US)

( * ) Notice: Subject to any disclaimer, the term of this patent is extended or adjusted under 35 U.S.C. 154(b) by 13 days.

(21) Appl. No.: 13/135,513

(22) Filed: Jul. 6, 2011

(51) Int. Cl.
*A63F 1/00* (2006.01)
(52) U.S. Cl. .................. 273/308; 273/292; 273/302
(58) Field of Classification Search .......... 273/292, 273/302, 308
See application file for complete search history.

(56) References Cited

U.S. PATENT DOCUMENTS

2008/0099995 A1* 5/2008 Maxwell ................. 273/292

* cited by examiner

*Primary Examiner* — Michael Dennis
(74) *Attorney, Agent, or Firm* — Rodney B. Jordan

(57) ABSTRACT

An educational game where cards with academic subjects written on them are drawn from a deck and where players try to guess the subject by viewing drawings made by the person who has drawn the card and where the academic subjects are discussed by the players during the process.

2 Claims, 1 Drawing Sheet

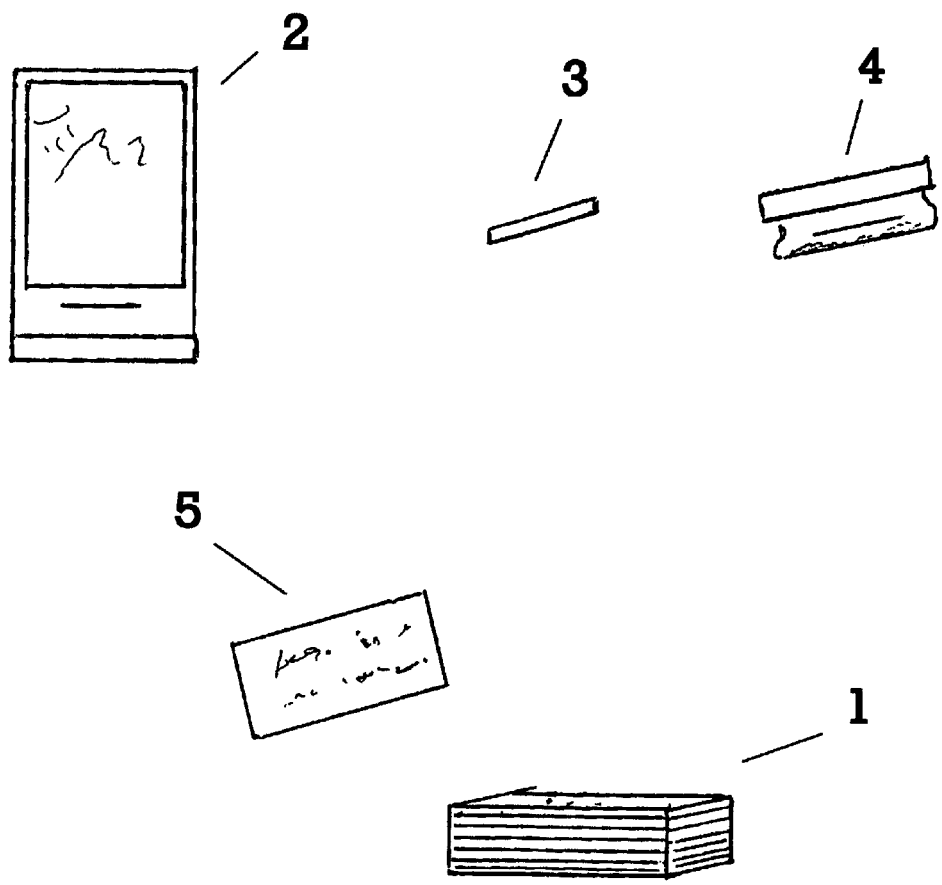

DRAW AND LEARN, AN EDUCATIONAL CARD GAME

BACKGROUND OF THE INVENTION

The present invention relates to a game that when played will increase the knowledge of all who participate. Knowledge, although not a tangible substance, always results in things that can be held in one's hand. It is man's knowledge, applied to the physical things at his disposal, that has resulted in every creation that has ever been made. Surely a process, game if you will, that brings about an increase in knowledge can be said to have a physical result, therefore it is the contention of this inventor and the purpose of this invention to bring about an increase in knowledge in human beings and the good results that follow.

DESCRIPTION OF THE PRIOR ART

There have been many learning oriented games produced over the years. Recently, the popularity of such games has risen dramatically as learning groups search for an alternative to conventional, sometimes boring, learning methods. These games, although useful, lack the range, effectiveness, and educational value possessed by the present invention. The present invention is designed to be played with a small group or an entire class, including a teacher or monitor. Unlike prior games, it introduces fun and intrigue into the learning process by having students guess their way to the knowledge being offered.

BRIEF DESCRIPTION OF THE DRAWINGS

FIGURE one is a layout of the principle components of the game.

DETAILED DESCRIPTION

Referring to the drawing, FIGURE one, it can be seen that the game components comprise a stack of cards 1, a chalkboard 2, a piece of chalk 3, and an eraser 4. Stack of cards 1 further comprises individual cards 5, each with a phrase or word corresponding to a subject of study inscribed upon it.

The process for playing the game is as follows: One person, perhaps a teacher, acts as a moderator and supervises the game. The moderator opens the game by drawing a card 5 from stack of cards 1. The moderator then begins to draw pictures related to the subject of the card 5 on chalkboard 2. As the moderator draws pictures on chalkboard 2 for clues as to the subject, the participants attempt to guess the subject in question. Once the subject is guessed, the moderator/teacher asks questions of the group and gives information as to the subject that was listed on card 5. After a thorough discussion of that subject, the chalkboard 2 is erased with eraser 4 and the participant who guessed the subject is allowed to draw a card 5 from the stack of cards 1. That participant then draws pictures on chalkboard 2, giving the other participants clues as to the subject of the card 5 that was drawn. Again, once the subject is guessed, the moderator/teacher asks questions and holds a discussion concerning the subject. The process is then repeated. The game is played until the allotted class time is over. Although this is the preferred embodiment, the chalkboard may be substituted by a variety of writing surfaces such as paper, note pad or smart board.

I claim:

1. A process for playing an educational card game, said game having a stack of cards, each card of said stack having an academic subject inscribed upon it, an apparatus for drawing, and a drawing surface for the inscription of drawings by said drawing apparatus, each said drawing being related to said academic subject, a moderator and a plurality of players, said process comprising; (a) Having said moderator pull a card from said stack of cards, (b) Having said moderator draw pictures on said drawing surface, said pictures relating to said academic subject inscribed on said card, (c) Having said players guess as to the academic subject inscribed on said card until one said player guesses correctly, (d) Having said moderator lead a discussion of said academic Subject inscribed on said card drawn by said moderator, (e) Having said player who guessed correctly draw a card from said stack and view said academic subject inscribed on said card, (f) Having said player produce drawings on said drawing surface, said drawings relating to said academic subject inscribed on said card drawn by said player, (g) Having said players guess as to the academic subject inscribed on said card drawn by said winning player until one said player guesses correctly, (h) Having said moderator lead a discussion of said academic subject inscribed on said card drawn by said winning player, and (i) Repeating said process for a specific amount of time.

2. A process for playing an educational card game, said game having a stack of cards, each card of said stack having an academic subject inscribed upon it, an apparatus for drawing, and a drawing surface for the inscription of drawings by said drawing apparatus, each said drawing being related to said academic subject, a moderator and a plurality of players, said process comprising; (a) Having said moderator pull a card from said stack of cards, (b) Having said moderator draw pictures on said drawing surface, said pictures relating to said academic subject inscribed on said card, (c) Having said players guess as to the academic subject inscribed on said card until one said player guesses correctly, (d) Having said moderator lead a discussion of said academic Subject inscribed on said card drawn by said moderator, (e) Having said player who guessed correctly draw a card from said stack and view said academic subject inscribed on said card, (f) Having said player produce drawings on said drawing surface, said drawings relating to said academic subject inscribed on said card drawn by said player, (g) Having said players guess as to the academic subject inscribed on said card drawn by said winning player until one said player guesses correctly, (h) Having said moderator lead a discussion of said academic subject inscribed on said card drawn by said winning player, and (i) Repeating said process until a certain number of said cards have been drawn.

\* \* \* \* \*